United States Patent Office 3,048,013
Patented Aug. 7, 1962

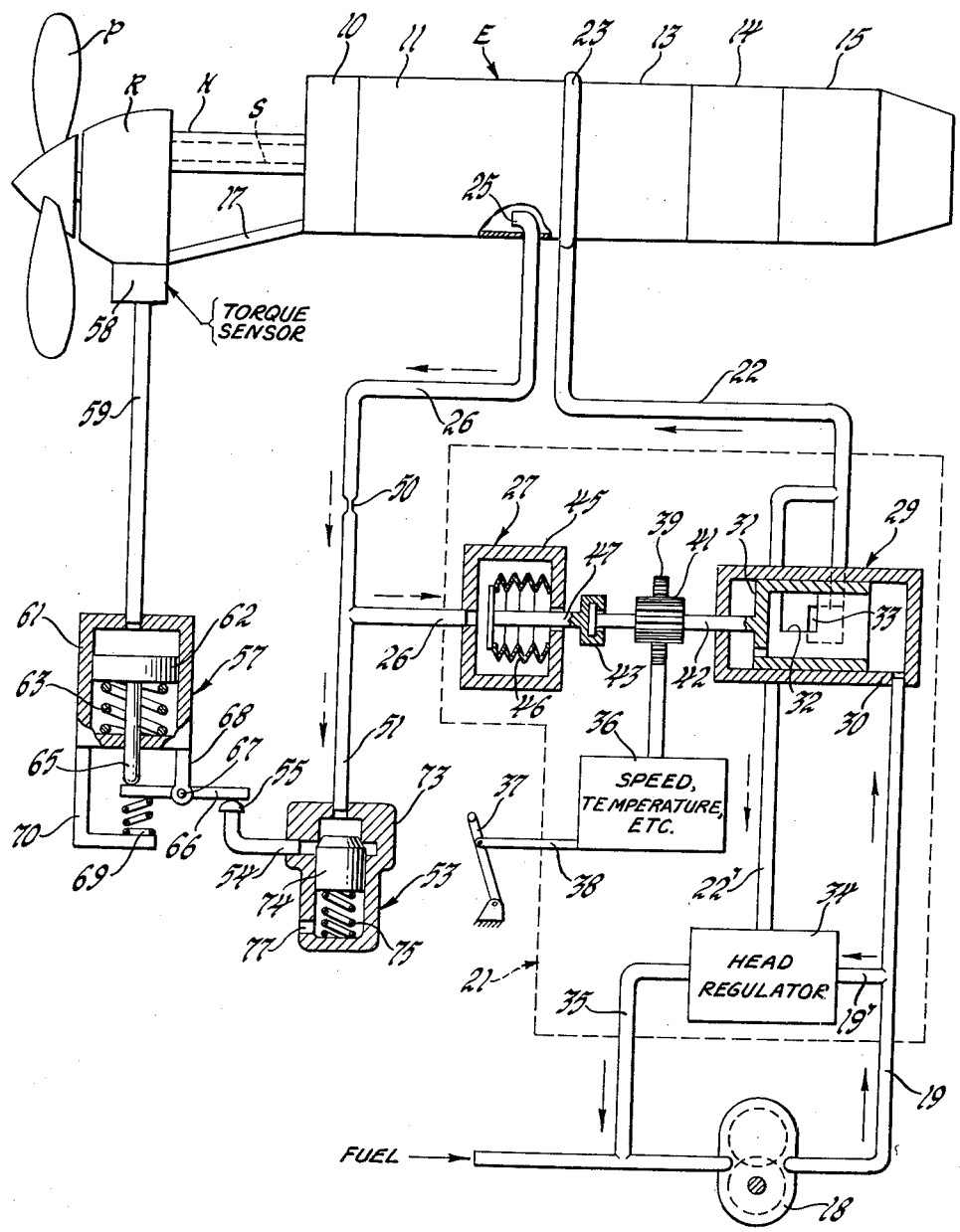

3,048,013
TORQUE LIMITER
Eugene J. Bevers and Robert J. Wente, Indianapolis, Ind., assignors to General Motors Corporation, Detroit, Mich., a corporation of Delaware
Filed Nov. 25, 1959, Ser. No. 855,352
3 Claims. (Cl. 60—39.28)

Our invention relates particularly to fuel controls for gas turbine engines, although it is applicable to other installations. The invention is directed to providing improved means for limiting the torque output of an engine.

It is well known that gas turbine engines of a shaft power output type, including turboprop and turboshaft engines, are ordinarily controlled to maintain a desired engine speed and turbine temperature, although other modes of control are known.

With the usual controls which primarily protect the engine by limiting turbine temperature, the power output of the engine varies widely with operating conditions, particularly the pressure and temperature of the air entering the engine. Specifically, the higher the atmospheric pressure, the greater the engine power output for a given turbine temperature. Likewise, the colder the air entering the engine the greater the power output.

Aircraft engines designed to deliver a given power output at takeoff under hot day conditions may deliver considerably greater power at low altitudes on a cold day. High speed forward motion of the aircraft, by virtue of the ram effect in the engine air intake, also effectively raises the pressure of the air supplied to the engine and, therefore, its power output.

Since the rated power output of the engine is adequate to handle the aircraft in which it or they are installed, and because it is most desirable to avoid unnecessary bulk and weight of the reduction gear which couples the engine to the driven device such as a propeller, a reduction gear which is entirely adequate to handle the rated power output of the engine may be seriously overloaded if the engine is allowed to deliver its temperature limited output under cold day conditions at low altitudes and at high forward speeds.

For this reason automatically operating means to limit the power output or torque of the engine to a safe value is highly desirable. In our Patent No. 2,982,096 we disclose and claim mechanism of one type to limit engine torque. Our present invention is directed to a different mechanism for this purpose which has conspicuous advantages in the simplicity of the system. This invention requires only a small amount of equipment additional to that ordinarily present in the usual fuel control or fuel metering device.

The present invention is preferably employed with fuel controls in which the supply of fuel to the engine is controlled in part by compressor outlet pressure or pressure from some intermediate compressor stage so that the supply of fuel is increased with increase in such pressure. In such a control, our present system includes means responsive to overtorque of the engine to bleed air from and thereby reduce the pressure in a compressor pressure response of the fuel control, with the result that the fuel supplied to the engine and thereby its torque output are decreased. The principles of the invention are applicable to limiting fuel by other mechanisms, but the modification of the compressor pressure sense is a particularly convenient and suitable mode of carrying out the invention.

The nature of our invention and the advantages thereof will be clear to those skilled in the art from the succeeding detailed description of the preferred embodiment of the invention and the accompanying drawing, which is a schematic diagram of our system as applied to a turboprop aircraft engine of known type.

Referring to the drawing, a gas turbine engine E drives a speed governing propeller P through an extension shaft S enclosed in a housing H and a reduction gear R. The engine may include an air inlet housing 10, a compressor or compressors 11, a combustion section 13, a turbine or turbines 14, and an exhaust duct 15. The engine may be coupled to the reduction gear by the shaft housing H and by struts 17. Fuel from a suitable source is supplied to the engine by a pump 18, which may be driven by the engine, through a conduit 19 and fuel control mechanism indicated generally as 21. The fuel control mechanism is connected by a conduit 22 to a fuel manifold 23 which delivers the fuel to the combustion apparatus of the engine.

The fuel control may be of any suitable type and, particularly in connection with the illustrated embodiment of the invention, of any suitable type including fuel metering means responsive to a pressure developed in the compressor of the engine. Ordinarily, the pressure relied upon for control is compressor discharge pressure; so, for conciseness, the controlling pressure will be referred to hereinafter as compressor discharge pressure or CDP. CDP is sensed by a pressure probe 25 mounted in the discharge portion of the compressor and connected through a conduit 26 to a pressure responsive device 27 in the fuel control. Such fuel controls are responsive to various conditions of engine operation such as engine speed, air inlet temperature, turbine temperature, and the like, and to a manual control which determines in general the operating level of the engine and ordinarily also controls the propeller. Since the details of such controls are immaterial to the invention which may be employed with controls of various types, the drawing illustrates schematically only the rudiments of a typical control. In practice, such controls are extremely complicated and illustration and description of the details thereof would be burdensome and would contribute nothing to an understanding of our invention.

As illustrated herein, the fuel control 21 includes a main metering valve 29 including a valve cylinder 30 in which a valve piston 31 is reciprocable and rotatable. A rectangular port 32 through the valve piston cooperates with a rectangular port 33 in the cylinder which discharges into the conduit 22. Fuel may enter the open end of valve piston 31 from conduit 19, which enters the cylinder 30. As the valve member moves to the right, as illustrated, the port area and therefore the fuel flow are increased. Also, rotation of the valve member varies the angular extent of the valve opening and likewise modulates fuel flow. A constant metering head across valve 29 is maintained by a head regulating valve 34 which connects a branch 19' of line 19 to a return line 35 in response to the pressure difference between line 19' and a pressure line 22' extending from metered fuel conduit 22.

Axial movement of the valve member 31 is effected by coupling to the pressure responsive device 27. Angular or rotary movement of the valve member is effected by additional devices responsive to engine operating conditions indicated by the rectangle 36. The assembly 36 may include the usual devices responsive to engine speed and inlet temperature and the aircraft pilot's power control setting. Other controls may be included.

The pilot's power control is represented by lever 37 coupled by a link 38 to the fuel control device 36. The fuel control device reciprocates a rack 39 which meshes with an elongated gear or pinion 41 on a stem 42 fixed to valve piston 31. A rotatable coupling 43 which transmits axial movement connects the stem 42 to the CDP responsive device 27. The CDP responsive device comprises a housing 45 connected to line 26 and enclosing an expansible bellows 46. The bellows may house a spring (not illustrated) or may be expanded by its inherent resilience. The head of the bellows 46 is coupled by a pushrod 47 and the coupling 43 to valve stem 42. Increase of pressure within the housing 45 compresses the bellows, moving valve member 31 to the right to open the port 32, 33 and increase engine fuel flow in proportion to the pressure in housing 45.

It is to be understood that the structure so far described is known structure to which our invention is added to provide our improved torque limiting control, and that it is merely illustrative of many engine fuel control installations.

In adding our invention to the known fuel control, we provide means for reducing the pressure in the responsive device 27 in response to excessive torque or power output of the engine, which acts by bleeding air from the housing 45. To make our control most effective, an orifice 50 is provided in the line 26 connecting the pressure probe 25 to the responsive device. A branch line 51 leads from the line 26 between the orifice 50 and the responsive device, through a safety valve 53 and a conduit 54 to a bleed valve 55 operated by a torque responsive mechanism 57. Considering first the torque responsive mechanism, this may be of various types; but, for simplicity of presentation in the drawing, it is illustrated as being of a type which includes means for deriving or generating a hydraulic fluid pressure proportional to the torque output of the engine. Torque responsive devices of this type in connection with engine reduction gears are very well known. The means for generating the hydraulic pressure indicative of torque is represented by the torque sensor 58 mounted in or on the reduction gear R. This torque sensor is connected by conduit 59 to the cylinder 61 of the torque responsive device 57. The fluid pressure which increases with torque acts against a piston 62 which is biased in the opposite direction by a compression spring 63. A rod or plunger 65 fixed to piston 61 is thus projected from the cylinder in proportion to the engine torque output. Upon increase in torque above the predetermined desired level, plunger 65 engages one end of a rocker arm 66 pivoted at 67 on a bracket 68 fixed to cylinder 61. The movable half-ball valve member 55 on the other end of rocker arm 66 normally closes the end of conduit 54, and is biased to this position by a compression spring 69 acting between the rocker arm and a bracket 70 fixed to cylinder 61. To explain the operation of this device, we may assume for the present that safety valve 53 is open and has no effect upon the operation of the system. In this case, as torque increases plunger 65 moves outward and, upon reaching the preset torque limit, engages rocker arm 66 to open valve 55 and bleed air from the CDP responsive device 27 through lines 26, 51, and 54. Since the flow from the compressor is throttled at orifice 50, opening valve 55 reduces the pressure in the housing 45, the bellows 46 expands, moves valve member 31 in a closing direction, reduces the fuel supply to the engine, and thereby reduces the torque. As the torque is reduced, plunger 65 is retracted, and the system will arrive at an equilibrium in which fuel is controlled so as to maintain engine torque very closely at the desired limiting value.

The safety valve 53 is an important feature of our invention, minimizing the possibility of malfunction of the system. Valve 53 is a spring-loaded poppet valve comprising a housing 73 and a reciprocating valve plunger 74 which seats against the inlet from conduit 51. Plunger 74 is biased to valve closing position by a compression spring 75 mounted in the housing 73, and the rear face of plunger 74 is vented to atmospheric pressure through a port 77. Spring 75 is of such strength as to hold valve 53 closed until the pressure in line 51 rises above a predetermined value determined by the operating characteristics of the engine. In a particular design for an engine of about 13 to 1 compression ratio, valve 74 is loaded so as to open at 125 p.s.i.a., which is about 70% of rated compressor discharge pressure under standard sea level static conditions. Valve 53 acts as a safety valve in that it prevents the torque responsive device 57 from lowering the pressure in the CDP responsive device 27 below 125 p.s.i.a. Thus, in the event of any malfunction of the torque meter or of valve 55 which causes the valve 55 to open, the controlling pressure cannot be bled down below 125 p.s.i.a. The 125 pound value is sufficient to assure supply of sufficient fuel to the engine under full power setting of the power control lever 37 to obtain somewhere near full power from the engine. It is below the value at which any serious overtorque would occur. Thus, in normal low altitude operation of the engine for takeoff or climb, the pressure in line 51 would be above 125 p.s.i.a. Valve 53 would be open, and the torque responsive device 57 would be operative to reduce fuel in the event of overtorque as previously described. However, if, through failure of some component, air should bleed from line 54 even though torque is not above the limit, valve 53 acts to throttle flow from line 51 and maintain the pressure in the responsive device 27 at a minimum value of 125 p.s.i.a.

In normal high altitude flight, because of the lower pressure of air entering the engine, compressor discharge pressure is below 125 p.s.i.a. and valve 53 remains closed. This is not objectionable since, with the lower atmospheric pressures, the engine is always temperature limited to a power output below that which would overload the reduction gear.

As previously stated, the illustration herein of a hydraulic torquemeter as part of the system is principally for convenience and simplicity in illustration. Any other device responsive to torque or, if desired, to power output of the engine could be employed to actuate valve 55. For example, the system of our Patent No. 2,982,096 illustrates means by which a torque motor controlled by an electronic torquemeter operates a bleed valve. Such mechanism could be substituted for the torque responsive mechanism illustrated. Also, a purely mechanical device responsive to torque in the reduction gear of the nature of those shown in U. S. Patents Nos. 2,936,655 and 2,959,228 might be utilized to actuate a plunger such as 65 to operate the bleed valve.

It will also be appreciated that while compressor discharge pressure is a very suitable quantity for use by our torque limiting system, the principles thereof may be employed in mechanisms to modulate some other input to the fuel metering valve rather than the CDP input.

The advantages of the invention will be apparent from the foregoing. Since a torquemeter is a usual component of such engines, the additional equipment needed for torque limiter amounts to no more than the torque responsive device 57, valve 55, safety valve 53, orifice 50, and a small amount of air piping. The device is thus compact, inexpensive, and of light weight and may be added to an engine fuel system without modification of the fuel piping or of the main fuel control as such.

Our system provides a very sensitive and accurate torque limiting device and is fail-safe because of the provision of the safety valve which prevents undue reduction of the CDP sense in the event of failure of the torque responsive apparatus. The safety valve is not, however, essential to operation of the torque limiter.

The detailed description of the preferred embodiment of the invention for the purpose of explaining the principles thereof is not to be considered as limiting or restricting the invention, since many modifications may be made by the exercise of skill in the art within the scope of the invention.

We claim:

1. A fuel system for a gas turbine engine having a power output shaft comprising, in combination, means for supplying fuel under pressure, fuel metering means responsive to manual control and to conditions indicative of operation of the engine, conduit means connecting the supplying means through the metering means to the engine; means deriving a control signal from the engine compressor indicative of an engine operating condition, means responsive to the said signal coupled to the metering means so as to increase fuel flow in response to increase in the said signal, means connecting the deriving means to the signal responsive means; a meter indicative of power transmitted through the output shaft; means actuated by the meter above a predetermined power level connected to the signal responsive means so as to reduce the effective signal thereto upon actuation thereof, and means operating to limit reduction of the signal by the last-mentioned means to a predetermined value of the signal.

2. A fuel system for a gas turbine engine having a power output shaft comprising, in combination, means for supplying fuel under pressure, fuel metering means responsive to manual control and to conditions indicative of operation of the engine, conduit means connecting the supplying means through the metering means to the engine; means deriving a pressure indicative of an engine operating condition, means responsive to the said pressure coupled to the metering means so as to increase fuel flow in response to increase in the said pressure, means including a restricted conduit connecting the deriving means to the pressure responsive means; a meter indicative of power transmitted through the output shaft; bleed valve means opened by the meter above a predetermined torque level, a conduit connecting the bleed valve means to the pressure responsive means so as to reduce the pressure therein upon opening of the bleed valve; and a safety valve in the said conduit opening in response to pressure in the pressure responsive means only when the said pressure is above a predetermined level.

3. A fuel system for a gas turbine engine having a power output shaft comprising, in combination, means for supplying fuel under pressure, fuel metering means responsive to manual control and to conditions indicative of operation of the engine, conduit means connecting the supplying means through the metering means to the engine; means deriving a pressure from the engine compressor, means responsive to the said pressure coupled to the metering means so as to increase fuel flow in response to increase in the said pressure, means including a restricted conduit connecting the deriving means to the pressure responsive means; a torquemeter indicative of power transmitted through the output shaft; bleed valve means opened by the torquemeter above a predetermined torque level, a conduit connecting the bleed valve means to the pressure responsive means so as to reduce the pressure therein upon opening of the bleed valve; and a safety valve in the said conduit opening in response to pressure in the pressure responsive means only when the said pressure is above a predetermined level.

References Cited in the file of this patent

UNITED STATES PATENTS

| | | |
|---|---|---|
| 2,691,268 | Prentiss | Oct. 12, 1954 |
| 2,759,549 | Best | Aug. 21, 1956 |
| 2,879,643 | Stroh | Mar. 31, 1959 |
| 2,910,125 | Best | Oct. 27, 1959 |
| 2,912,822 | Hooker | Nov. 17, 1959 |
| 2,926,732 | Chamberlin | Mar. 1, 1960 |
| 2,931,442 | Stanton et al. | Apr. 5, 1960 |
| 2,936,583 | Turek | May 17, 1960 |

FOREIGN PATENTS

| | | |
|---|---|---|
| 783,531 | Great Britain | Sept. 25, 1957 |